United States Patent
Deosaran et al.

[11] Patent Number: 6,138,231
[45] Date of Patent: *Oct. 24, 2000

[54] SYSTEM AND METHOD FOR REGISTER RENAMING

[75] Inventors: Trevor A. Deosaran, Sunnyvale; Sanjiv Garg, Fremont; Kevin R. Iadonato, San Jose, all of Calif.

[73] Assignee: Seiko Epson Corporation, Tokyo, Japan

[*] Notice: This patent is subject to a terminal disclaimer.

[21] Appl. No.: 09/063,059

[22] Filed: Apr. 21, 1998

(Under 37 CFR 1.47)

Related U.S. Application Data

[63] Continuation of application No. 08/698,211, Aug. 15, 1996, Pat. No. 5,809,276, which is a continuation of application No. 08/478,531, Jun. 7, 1995, Pat. No. 5,590,295, which is a continuation of application No. 07/997,948, Dec. 31, 1992, abandoned.

[51] Int. Cl.[7] ............................................. G06F 9/30
[52] U.S. Cl. ......................... 712/216; 712/217; 712/218; 712/228
[58] Field of Search ................................ 395/392, 393, 395/394, 569; 712/216, 217, 218, 228

[56] References Cited

U.S. PATENT DOCUMENTS

| | | | |
|---|---|---|---|
| 4,626,989 | 12/1986 | Torii | 712/217 |
| 4,675,806 | 6/1987 | Uchida | 412/201 |
| 4,722,049 | 1/1988 | Lahti | 455/10 |
| 4,807,115 | 2/1989 | Torng | 712/215 |
| 4,901,233 | 2/1990 | Liptay | 395/375 |
| 4,903,196 | 2/1990 | Pomerene et al. | 395/375 |
| 4,942,525 | 7/1990 | Shintani et al. | 395/375 |
| 4,992,938 | 2/1991 | Cocke et al. | 364/200 |
| 5,067,069 | 11/1991 | Fite et al. | 395/375 |
| 5,072,364 | 12/1991 | Jardine et al. | 395/375 |
| 5,109,495 | 4/1992 | Fite et al. | 395/375 |
| 5,142,633 | 8/1992 | Murray et al. | 395/375 |
| 5,167,026 | 11/1992 | Murray et al. | 395/375 |
| 5,214,763 | 5/1993 | Blaner et al. | 395/375 |
| 5,222,244 | 6/1993 | Carbine et al. | 395/800 |
| 5,226,126 | 7/1993 | McFarland et al. | 712/218 |

(List continued on next page.)

FOREIGN PATENT DOCUMENTS

| | | | |
|---|---|---|---|
| 0 378 195 A3 | 8/1990 | European Pat. Off. | G06F 5/06 |
| 0 515 166 | 11/1992 | European Pat. Off. | G06F 9/38 |
| 0 533 337 A1 | 3/1993 | European Pat. Off. | G06F 9/38 |
| WO 88/09035 | 11/1988 | WIPO | G11C 8/00 |
| WO 91/20031 | 12/1991 | WIPO | G06F 9/45 |

OTHER PUBLICATIONS

Smith et al., "Implementation of Precise Interrupts in Pipelined Processors," *Proceedings of the 12th Annual International Sympsium on Computer Architecture*, Jun. 1985, pp. 36–44.

(List continued on next page.)

*Primary Examiner*—Zarni Maung
*Assistant Examiner*—Saleh Najjan
*Attorney, Agent, or Firm*—Sterne, Kessler, Goldstein & Fox P.L.L.C.

[57] ABSTRACT

A system and method for performing register renaming of source registers in a processor having a variable advance instruction window for storing a group of instructions to be executed by the processor, wherein a new instruction is added to the variable advance instruction window when a location becomes available. A tag is assigned to each instruction in the variable advance instruction window. The tag of each instruction to leave the window is assigned to the next new instruction to be added to it. The results of instructions executed by the processor are stored in a temp buffer according to their corresponding tags to avoid output and anti-dependencies. The temp buffer therefore permits the processor to execute instructions out of order and in parallel. Data dependency checks for input dependencies are performed only for each new instruction added to the variable advance instruction window and register renaming is performed to avoid input dependencies.

43 Claims, 8 Drawing Sheets

U.S. PATENT DOCUMENTS

| | | | |
|---|---|---|---|
| 5,230,068 | 7/1993 | Van Dyke et al. | 711/137 |
| 5,251,306 | 10/1993 | Tran | 395/375 |
| 5,255,384 | 10/1993 | Sachs et al. | 395/425 |
| 5,261,071 | 11/1993 | Lyon | 395/425 |
| 5,278,963 | 1/1994 | Hattersley et al. | 395/400 |
| 5,317,720 | 5/1994 | Stamm et al. | 395/425 |
| 5,345,569 | 9/1994 | Tran | 395/375 |
| 5,355,457 | 10/1994 | Shebanow et al. | 395/375 |
| 5,371,684 | 12/1994 | Iadonato et al. | 364/491 |
| 5,398,330 | 3/1995 | Johnson | 395/575 |
| 5,442,757 | 8/1995 | McFarland et al. | 712/218 |
| 5,448,705 | 9/1995 | Nguyen et al. | 395/375 |
| 5,487,156 | 1/1996 | Popescu et al. | 712/217 |
| 5,497,499 | 3/1996 | Garg et al. | 395/800 |
| 5,524,225 | 6/1996 | Kranich | 711/3 |
| 5,560,032 | 9/1996 | Nguyen et al. | 395/800 |
| 5,561,776 | 10/1996 | Popescu et al. | 712/239 |
| 5,574,927 | 11/1996 | Scantlin | 712/41 |
| 5,590,295 | 12/1996 | Deosoran et al. | 395/393 |
| 5,592,636 | 1/1997 | Popescu et al. | 712/239 |
| 5,606,676 | 2/1997 | Grochowski et al. | 712/239 |
| 5,619,668 | 4/1997 | Zaidi | 712/200 |
| 5,625,837 | 4/1997 | Popescu et al. | 712/23 |
| 5,627,983 | 5/1997 | Popescu et al. | 712/217 |
| 5,708,841 | 1/1998 | Popescu et al. | 712/23 |
| 5,737,624 | 4/1998 | Garg et al. | 395/800.23 |
| 5,768,575 | 6/1998 | McFarland et al. | 712/228 |
| 5,778,210 | 7/1998 | Henstrom et al. | 712/218 |
| 5,797,025 | 8/1998 | Popescu et al. | 712/23 |
| 5,809,276 | 9/1998 | Deosaran et al. | 712/217 |
| 5,832,205 | 11/1998 | Kelly et al. | 714/53 |
| 5,832,293 | 11/1998 | Popescu et al. | 712/23 |

OTHER PUBLICATIONS

Wedig, R.G., *Detection of Concurrency In Directly Executed Language Instruction Streams*, (Dissertation), Jun. 1982, pp. 1–179.

Agerwala et al., "High Performance Reduced Instruction Set Processors," IBM Research Division, Mar. 31, 1987, pp. 1–61.

Gross et al., "Optimizing Delayed Branches," *Proceedings of the 5th Annual Workshop on Microprogramming*, Oct. 5–7, 1982, pp. 114–120.

Tjaden et al., "Representation of Concurrency with Ordering Matrices," *IEEE Trans. On Computers*, vol. C–22, No. 8, Aug. 1973, pp. 752–761.

Tjaden, *Representation and Detection of Concurrency Using Ordering Matrices*, (Dissertation), 1972, pp. 1–199.

Foster et al., "Percolation of Code to Enhance Parallel Dispatching and Execution," *IEEE Trans. On Computers*, Dec. 1971, pp. 1411–1415.

Thornton, J.E., *Design of a Computer: The Control Data 6600*, Control Data Corporation, 1970, pp. 58–140.

Weiss et al., "Instruction Issue Logic in Pipelined Supercomputers," Reprinted from *IEEE Trans. on Computers*, vol. C–33, No. 11, Nov. 1984, pp. 1013–1022.

Tomasulo, R.M., "An Efficient Algorithm for Exploiting Multiple Arithmetic Units," *IBM Journal*, vol. 11, Jan. 1967, pp. 25–33.

Tjaden et al., "Detection and Parallel Execution of Independent Instructions," *IEEE Trans. On Computers*, vol. C–19, No. 10, Oct. 1970, pp. 889–895.

Smith et al., "Limits on Multiple Instruction Issue," *Proceedings of the 3rd International Conference on Architectural Support for Programming Languages and Operating Systems*, Apr. 1989, pp. 290–302.

Pleszkun et al., "The Performance Potential of Multiple Functional Unit Processors," *Proceedings of the 15th Annual Symposium on Computer Architecture*, Jun. 1988, pp. 37–44.

Pleszkun et al., "WISQ: A Restartable Architecture Using Queues," *Proceedings of the 14th International Symposium on Computer Architecture*, Jun. 1987, pp. 290–299.

Patt et al., "Critical Issues Regarding HPS, A High Performance Microarchitecture," *Proceedings of the 18th Annual Workshop on Microprogramming*, Dec. 1985, pp. 109–116.

Hwu et al., "Checkpoint Repair for High–Peformance Out–of–Order Execution Machines," *IEEE Trans. On Computers*, vol. C–36, No. 12, Dec. 1987, pp. 1496–1514.

Patt et al., "HPS, A New Microarchitecture: Rationale and Introduction," *Proceedings of the 18th Annual Workshop on Microprogramming*, Dec. 1985, pp. 103–108.

Keller, R.M., "Look–Ahead Processors," *Computing Surveys*, vol. 7, No. 4, Dec. 1975, pp. 177–195.

Jouppi et al., "Available Instruction–Level Parallelism for Superscalar and Superpipelined Machines," *Proceedings of the 3rd International Conference on Architectural Support for Programming Languages and Operating Systems*, Apr. 1989, pp. 272–282.

Hwu et al., "HPSm, a High Performance Restricted Data Flow Architecture Having Minimal Functionality," *Proceedings from ISCA–13*, Tokyo, Japan, Jun. 2–5, 1986, pp. 297–306.

Hwu et al., "Exploiting Parallel Microprocessor Microarchitectures with a Compiler Code Generator," *Proceedings of the 15th Annual Symposium on Computer Architecture*, Jun. 1988, pp. 45–53.

Colwell et al., "A VLIW Architecture for a Trace Scheduling Compiler," *Proceedings of the 2nd International Conference on Architectural Support for Programming Languages and Operating Systems*, Oct. 1987, pp. 180–192.

Uht, A.K., "An Efficient Hardware Algorithm to Extract Concurrency From General–Purpose Code," *Proceedings of the 19th Annual Hawaii International Conference on System Sciences*, 1986, pp. 41–50.

Charlesworth, A.E., "An Approach to Scientific Array Processing: The Architectural Design of the AP–120B/FPS–164 Family," *Computer*, vol. 14, Sep. 1981, pp. 18–27.

Acosta, Ramón D. et al., "An Instruction Issuing Approach to Enhancing Performance in Multiple Functional Unit Processors," *IEEE Transactions On Computers*, vol. C–35, No. 9, Sep. 1986, pp. 815–828.

Johnson, William M., *Super–Scalar Processor Design*, (Dissertation), Copyright 1989, 134 pages.

Sohi, Gurindar S. and Sriram Vajapeyam, "Instruction Issue Logic For High–Performance, Interruptable Pipelined Processors," *Conference Proceedings of the 14th Annual International Symposium on Computer Architecture*, Jun. 2–5, 1987, pp. 27–34.

Lightner et al. "The Metaflow Architecture," p. 11, 12, 63, 64, 67, and 68, Jun. 1991, *IEEE Micro Magazine*.

Keller, R., "Look–Ahead Processors", *Computing Surveys*, vol. 7, No. 4, Dec. 1975.

Critical Issues Regarding HPS, A High Performance Microarchitecture, Yale N. Patt, Stephen W. Melvin, Wen–Mei Hwu and Michael C. Shebanow; The 18th Annual Workshop on Microprogramming, Pacific Grove, California, Dec. 3–6, 1985, IEEE Computer Order No. 653, pp. 109–116.

HPS, A New Microarchitecture: Rationale and Introduction, Yale N. Patt, Wen–Mei Hwu and Michael Shebanow; The 18th Annual Workshop on Microprocessing, Pacific Grove, California, Dec. 3–6, 1985, IEEE Computer Society Order No. 653, pp. 103–108.

Johnson, Mike, Superscalar Microprocessor Design, "Chapter 5—The Role of Exception Recovery", pp. 87–102; "Chapter 6—Register Dataflow", pp. 103–125, Prentice Hall, 1991.

Peleg et al., "Future Trends in Microprocessors: Out–of–Order Execution, Spec. Branching and Their CISC Performance Potential", Mar. 1991.

IEEE Micro., "The Metaflow Architecture", Val Popescu et al., vol. 11, No. 3, pp. 10–13, 63–73, Jun. 1991.

Dywer, *A Multiple, Out–of–Order Instruction Issuing System for Superscalar Processors*, (All), Aug. 1991.

Hwu, Wen–mei, Steve Melvin, Mike Shebanow, Chein Chen, Jia–juin Wei, Yale Patt, "A HPS Implementation of VAX: Initial Design and Analysis", *Proceedings of the Nineteenth Annual Hawaii International Conference on System Sciences*, pp. 282–291, 1986.

Hwu et al., "Experiments with HPS, a Restricted Data Flow Microarchitecture for High Performance Computers", *COMPCON 86*, 1986.

Hwu, Wen–mei and Yale N. Patt, "HPSm, a High Performance Restricted Data Flow Architecture Having Minimal Functionality", *Proceedings of the 18th International Symposium on Computer Architecture*, pp. 297–306, Jun. 1986.

Yale N. Patt, Stephen W. Melvin, Wen–mei Hwu, Michael C. Shebanow, Chein Chen, Jiajuin Wei, "Run–Time Generation of HPS Microinstructions From a VAX Instruction Stream", *Proceedings of MICRO 19 Workshop*, New York, New York, pp. 1–7, Oct., 1986.

Swenson, John A. and Yale N. Patt, "Hierarchical Registers for Scientific Computers", *St. Malo '88*, University of California at Berkeley, pp. 346–353, 1988.

Butler, Michael and Yale Patt, "An Improved Area–Efficient Register Alias Table for Implementing HPS", University of Michigan, Ann Arbor, Michigan, pp. 1–15, Jan., 1990.

Uvieghara, G.A., W.Hwu, Y. Nakagome, D.K. Jeong, D. Lee, D.A. Hodges, Y. Patt, "An Experimental Single–Chip Data Flow CPU", *Symposium on ULSI Circuits Design Digest of Technical Papers*, May, 1990.

Melvin, Stephen and Yale Patt, "Exploiting Fine–Grained Parallelism Through a Combination of Hardware and Software Techniques", *Proceedings From ISCA–18*, pp. 287–296, May, 1990.

Butler, Michael, Tse–Yu Yeh, Yale Patt, Mitch Alsup, Hunter Scales and Michael Shebanow, "Single Instruction Stream Parallelism Is Greater Than Two" *Proceedings of ISCA–18*, pp. 276–286, May, 1990.

Uvieghara, Gregory A., Wen–mei, W. Hwu, Yoshinobu Nakagome, Deog–Kyoon Jeong, David D. Lee, David A. Hodges and Yale Patt, "An Experimental Single–Chip Data Flow CPU", *IEEE Journal of Solid–State Circuits*, vol. 27, No. 1, pp. 17–28, Jan., 1992.

Gee, Jeff, Stephen W. Melvin, Yale N. Patt, "The Implementationof Prolog via VAX 8600 Microcode", *Proceedings of Micro 19*, New York City, pp. 1–7, Oct., 1986.

Hwu, Wen–mei Hwu and Yale N. Patt, "Design Choices for the HPSm Microprocessor Chip", *Proceedings of the Twentieth Annual Hawaii International Conference on System Sciences*, pp. 330–336, 1987.

Wilson, James E., Steven Melvin, Michael Shebanow, Wen–mei Hwu and Yale N. Patt, "On Turning the Microarchitecture of an HPS Implementation of the VAX", *Proceedings of the Micro 20*, pp. 162–167, Dec., 1987.

Hwu, Wen–mei and Yale N. Patt, "HPSm2: A Refined Single–chip Microengine", *HICSS '88*, pp. 30–40, 1988.

Butler, Michael and Yale Patt, "An Investigation of the Performance of Various Dynamic Scheduling Techniques", *Proceedings from MICRO–25*, Dec. 1–4, 1992, pp. 1–9.

Kateveris, Hardware Support "Thesis," 1984, p. 138–145.

Hennessy, John L. et al. "Computer Architecture A Quantitative Approach," Ch. 6.4, 6.7 and p. 449, 1990.

Lightner, Bruce D. et al., "The Metaflow Lightning Chipset," p. 13, 14 and 16, 1991 *IEEE Publication*.

Aiken, A. and Nicolau, A., "Perfect Pipelining: A New Loop Parallelization Technique*," pp. 221–235.

Goodman, J.R. and Hsu, W., "Code Scheduling and Register Allocation in Large Basic Blocks," *ACM*, 1988, pp. 442–452.

Groves, R.D. and Oehler, R., "An IBM Second Generation RISC Processor Architecture," *IEEE*, 1989, pp. 134–137.

Horst, R.W. et al., "Multiple Instruction Issue in the Non-Stop Cyclone Processor," *IEEE*, 1990, pp. 216–226.

Jouppi, N.H., "Integration and Packaging Plateaus of Processor Performance," *IEEE*, 1989, pp. 229–232.

Jouppi, N.P., "The Nonuniform Distribution of Instruction–Level and Machine Parallelism and Its Effect on Performance," *IEEE Transactions on Computers*, vol. 38, No. 12, Dec. 1989, pp. 1645–1658.

Lam, M.S., "Instruction Scheduling For Superscalar Architectures," *Annu. Rev. Comput. Sci.*, vol. 4, 1990, pp. 173–201.

Murakami, K. et al., "SIMP (Single Instruction stream/ Multiple instruction Pipelining): A Novel High–Speed Single–Processor Architecture," *ACM*, 1989, pp. 78–85.

Smith, M.D. et al., "Boosting Beyond Static Scheduling in a Superscalar Processor," *IEEE*, 1990, pp. 344–354.

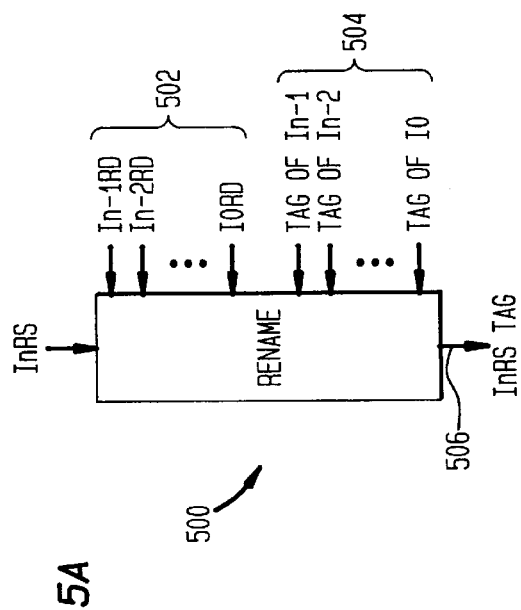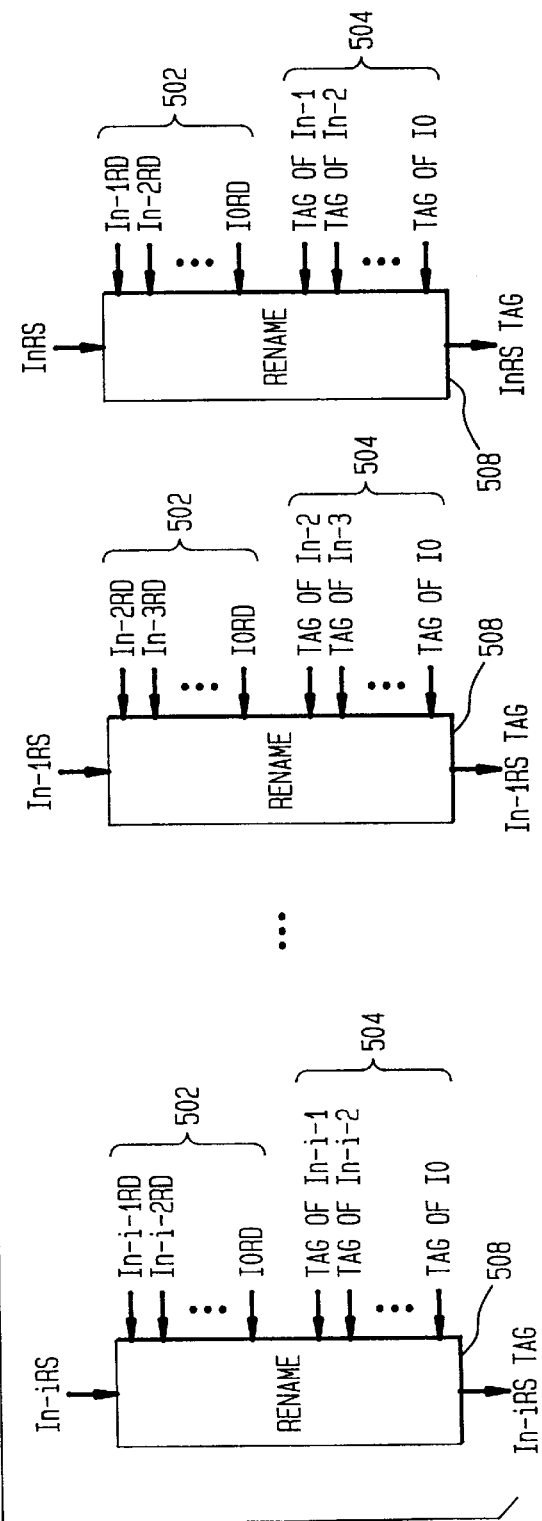
FIG. 5A
FIG. 5B

SYSTEM AND METHOD FOR REGISTER RENAMING

This application is a continuation of U.S. patent application Ser. No. 08/698,211, filed Aug. 15, 1996 (now U.S. Pat. No. 5,809,276) which is a continuation of U.S. patent application Ser. No. 08/478,531 now U.S. Pat. No. 5,590,295, filed Jun. 7, 1995, which is a continuation of U.S. patent application Ser. No. 07/997,948 filed Dec. 31, 1992 (Status: Abandoned).

CROSS-REFERENCE TO RELATED APPLICATIONS

The following are related, commonly owned, co-pending applications:

Superscalar RISC Instruction Scheduling, Ser. No. 07/860, 719, filed Mar. 31, 1992;

Semiconductor Floor Plan and Method for a Register Renaming Circuit, Ser. No. 07/860,718, filed Mar. 31, 1992;

System and Method for Retiring in a Superscalar Microprocessor, Ser. No. 07/877,451, filed May 15, 1992;

High Performance RISC Microprocessor Architecture, Ser. No. 07/817,810, filed Jan. 8, 1992;

Extensible RISC Microprocessor Architecture, Ser. No. 07/817,809, filed Jan. 8, 1992.

The above cited patent documents are incorporated herein by reference.

BACKGROUND OF THE INVENTION

1. Field of the Invention

The present invention relates to superscalar reduced instruction set computers (RISC), more particularly, the present invention relates to a register renaming circuit for superscalar RISC computers.

2. Related Art

A more detailed description of some of the basic concepts discussed in this application is found in a number of references, including Mike Johnson, *Superscalar Microprocessor Design* (Prentice-Hall, Inc., Englewood Cliffs, N.J., 1991) (hereafter Johnson); John L. Hennessy et al., *Computer Architecture—A Quantitative Approach* (Morgan Kaufmann Publishers, Inc., San Mateo, Calif., 1990). Johnson's text, particularly Chapters 2, 6 and 7 provide an excellent discussion of the register renaming issues addressed by the present invention.

A major consideration in a superscalar RISC processor is to how to execute multiple instructions in parallel and out-of-order, without incurring data errors due to dependencies inherent in such execution. Data dependency checking, register renaming and instruction scheduling are integral aspects of the solution. A detailed discussion of storage conflicts, register renaming and dependency mechanisms is found in commonly owned, co-pending U.S. patent application Ser. No. 07/860,719, filed Mar. 31, 1992, (hereafter referred to as the '719 application).

The '719 application discloses a register renaming circuit (RRC) having a fixed instruction window. In the fixed instruction window, dependency checking and resource assignment is done on the same set of instructions until all the instructions in the set are completed. This means that there is a fixed relationship between each instruction's position in the instruction stream and the instruction number used for resource assignment.

For example, in an instruction stream with an instruction window of 4 instructions every fourth instruction mapps to instruction A (i.e., the first instruction in the window). This technique makes re-mapping of instruction very simple. In this case a 4-to-1 multiplexer is all that is necessary for each resource to forward a single instruction to that resource. However, the fixed format requires that the instruction window be advanced by a fixed amount, which results in somewhat inefficient processing.

When an instruction retires (an instruction can retire after it has been executed without exception and when all previous instructions have been executed and their results are stored in the register file), its result is moved into a main register file (i.e., the programmable visible register file) and if any instructions were dependent on that instruction, their renamed sources are not needed anymore. In the architecture disclosed in the '719 application, all instructions' sources are renamed every cycle. This renaming technique requires many comparators for performing the dependency checks. More specifically, the source register addresses of each instruction must be compared to the destination register addresses of all preceding instructions in the instruction window every cycle.

What is desired is a more efficient register renaming technique requiring less comparators and permitting the processor to execute instructions in parallel and out of order.

SUMMARY OF THE INVENTION

The present invention is directed to a system and method for performing register renaming of source registers on a per-cycle basis only for new instructions added to the instruction window in that cycle. The present invention thus reduces the total number of dependency check comparators necessary for performing register renaming.

A preferred embodiment of the present invention comprises storing the instructions in a variable advance instruction window, and assigning a tag to each instruction in the instruction window. The tag of each retired instruction is assigned to the next new instruction to be added to the instruction window. The results of instructions executed by the processor are stored in a temp buffer according to their corresponding tags to avoid output dependencie and anti-dependencies. The temp buffer therefore permits the processor to execute instructions out of order and in parallel.

Data dependency checks are performed only for each new instruction added to the instruction window. Operands of the instructions having input dependencies are often located in the temporary buffer, and the source register addresses of those instructions having dependencies are renamed according to the tags of the operands located in the temp buffer. The renamed source register addresses are then stored in a rename result register file.

The foregoing and other features and advantages of the present invention will be apparent from the following more particular description of the preferred embodiments of the invention, as illustrated in the accompanying drawings.

BRIEF DESCRIPTION OF THE DRAWINGS

The invention will be better understood if reference is made to the accompanying drawings. A brief description of the drawings is as follows:

FIGS. 5A and 5B show representative block diagrams of the register rename block of the present invention.

DETAILED DESCRIPTION OF THE INVENTION

Figure 1:
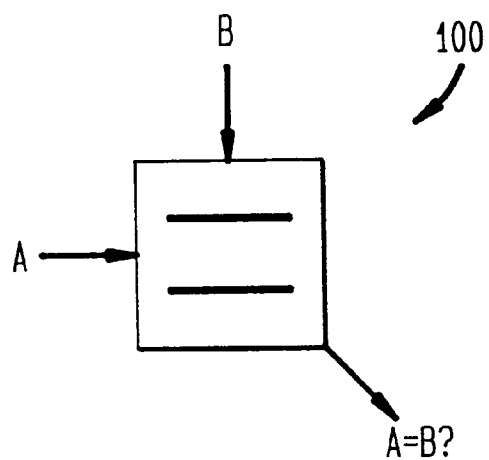
FIG. 1 shows a representative block diagram of a DDC equal compare circuit of the present invention.

The terms processor, CPU, and digital processor are often used interchangeably in this field. The term "processor" is used hereafter with the understanding that other similar terms could be substituted therefore without changing the underlying meaning of this disclosure.

The present invention is directed to a Register Renaming Circuit (RRC) which is part of a processor. The RRC permits the processor to execute instructions in parallel and out of order. In a preferred embodiment of the present invention, the processor has a variable advance instruction window (VAIW) for holding instructions from an instruction stream prior to execution. The RRC can be used with a fixed advance instruction window as well.

The VAIW in a preferred embodiment holds eight instructions, and up to four new instructions can be added to the top four locations of the VAIW in any one cycle.

In a VAIW, any one of instructions I0, I1, I2 and I3 can be mapped into the first location in the window (location A, for example). Tags are assigned to the instructions as the instructions enter the VAIW. The tags are stored in a first-in-first-out buffer (hereafter called a FIFO; not shown).

As an instruction advances in the VAIW by a variable amount, the tag associated with that instruction also advances in the FIFO by the same amount. When a new instruction enters the VAIW it is assigned the tag of the most recent instruction to leave the VAIW, thus tags are reused. Instructions can leave the VAIW by either retiring, or they can be flushed out if a branch is taken.

The tag of each instruction leaving the instruction window is returned to the head of the FIFO and re-used by the new instruction added to the window. However, the first instruction and tag in the FIFO always progress in order, because instructions always retire in order.

According to the present invention only new instructions in the VAIW need be checked for dependencies. This eliminates the need for excess comparators. New instructions in the window are therefore passed through the RRC. In order to reduce complexity by renaming the source registers for only those instructions that are new in the instruction window on a per-cycle basis, two assumptions are made:

1. Each instruction is's tag remains constant as long as the instruction remains in the window. This tag is also associated with the location in a temp buffer (discussed below) that the corresponding instruction's output will be stored.

2. At most, only a subset ($I_n$ to $I_{n-1}$) of the instructions in the window ($I_n$ to $I_0$) can be new in any given cycle.

In a preferred embodiment of the present invention, the temp buffer (or temporary buffer) is part of the main register file. The register file contains 40 registers; registers 0–31 are the main registers (commonly called the programmer visible registers), and registers 32–39 comprise the temp buffer. The temp buffer and main register file share the same read ports. Thus, to read the data from temp buffer address 4, {100100} would be the address on the read address port, for example.

In order to perform dependency checking in the present invention, an RRC Inputs Register File (RIRF) is used to hold the source and destination register addresses of all instructions in the instruction window. As new instructions enter the window an instruction fetch unit (IFU: not shown) sends the instructions' source and destination register addresses to the RIRF. The source and destination register addresses are stored in the RIRF by tag number. The RIRF has one output for each instruction in the window and the source and destination register addresses are read from the RIRF and sent to the RRC.

The RRC performs the data dependency checking and the register renaming. The data dependency check is done by the Data Dependency Checker (DDC) and the rename is performed by the Tag Assignment Logic (TAL).

There are three kinds of data dependencies: input dependencies, anti-dependencies and output dependencies. An instruction is input dependent on a previous instruction if one of its inputs is the previous instruction's output; an instruction is anti-dependent if the address of one of its source registers (RS) is the same as the address of a later instruction's destination register (RD); and an instruction is output dependent if the address of its destination register is the same as the address of another instruction's destination register.

Dependencies limit the amount of parallelism that a computer can exploit. For example, if instruction A is input dependent on instruction B, then instruction A must not be executed until after instruction B is executed. Also, if instruction A and B are output dependent and instruction A comes first in the program, then instruction A's result must be written to the main register file before instruction B's. Finally, if instruction A is anti-dependent on instruction B, then instruction B's result must not be written to the main register file until after instruction A has begun executing. Output and anti-dependencies are usually avoided by use of the temp buffer. Input dependencies cannot be avoided and are located by the DDC.

The DDC locates input dependencies by comparing the register file addresses of each instruction's sources with the register file addresses of each previous instruction's destination. If an instruction's input data comes from the same register file address as a previous instruction's output data, then they are dependent (the term "dependent" will be used to mean "input dependent" for the remainder of this description).

It is possible that an instruction can be dependent on several previous instructions. When this happens, the RRC assumes that the programmer intended that the instruction be dependent on the most previous instruction. For example, if instruction 5 depends on instructions 3 and 1, then the RRC would assume that the programmer intended instruction 5 to use instruction 3's results and not instruction 1's.

Figure 2:
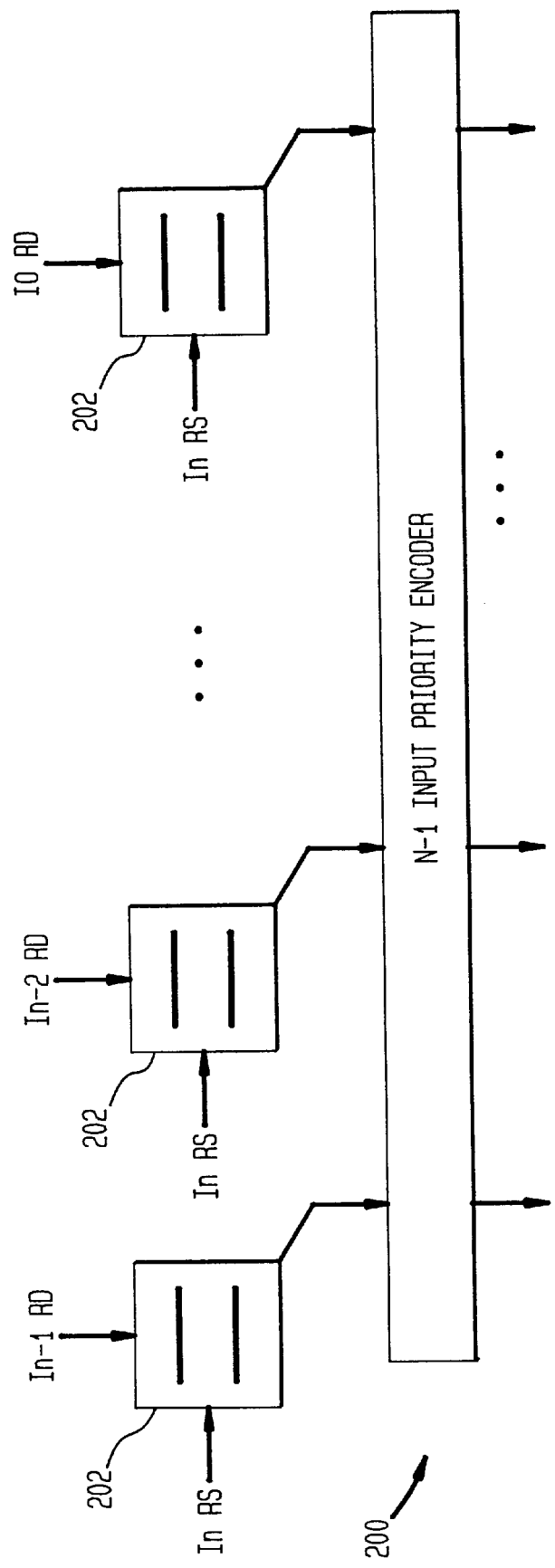
FIG. 2 shows a representative block diagram of an N-1 input priority encoder of the present invention.

A DDC equal compare circuit 100 for checking dependencies between instructions A and B in accordance with the present invention is shown in FIG. 1. The output (A=B?) of the DDC equal compare circuit 100 is sent to a priority encoder. A n-1 input priority encoder 200 is shown in FIG. 2. Priority encoder 200 checks the highest priority dependency for instruction n's source ($I_n$RS). The inputs at the top of priority encoder 200 are the data dependency comparisons of instruction n's source ($I_n$RS) with the destinations of all previous instructions ($I_{n-1}$RD-$I_0$RD), as determined by equal compare circuits 202. For example, if the $x^{th}$ bit of the priority encoder output is asserted, then instruction n is input dependent on instruction x.

The present invention avoids the problems caused by output and anti-dependencies by storing the results of all instructions in the temp buffer and then moving the results into the main register file in program order. For example, if instruction 1 finishes before instruction 0, its result will be written to the register file after instruction 0's result is written to the register file. The use of the temp buffer allows the processor to execute instructions out of order and in parallel. Since the results of the instructions are moved to the main register file in order, output and anti-dependencies do not cause a problem.

Since the result of an instruction can sit in the temp buffer for a long time before it gets moved to the main register file, instructions that are dependent on that instruction will also have to wait. In order to improve performance, the present invention includes a means with which to use data that is in the temp buffer. That means is the Tag Assignment Logic (TAL).

The TAL determines the location in the temp buffer of the operands of dependent instructions. As noted above all instructions are assigned a tag that remains constant while the instruction is in the window, and there is one location in the temp buffer for each instruction in the window. Thus, the processor implementing the present invention uses the tag of an instruction as the temp buffer address of that instruction's result.

Since the TAL knows where every instruction's result is stored, and since it also knows (from the DDC) where the dependencies are between instructions, the TAL can determine the location in the temp buffer of each instruction's inputs.

Figure 3:
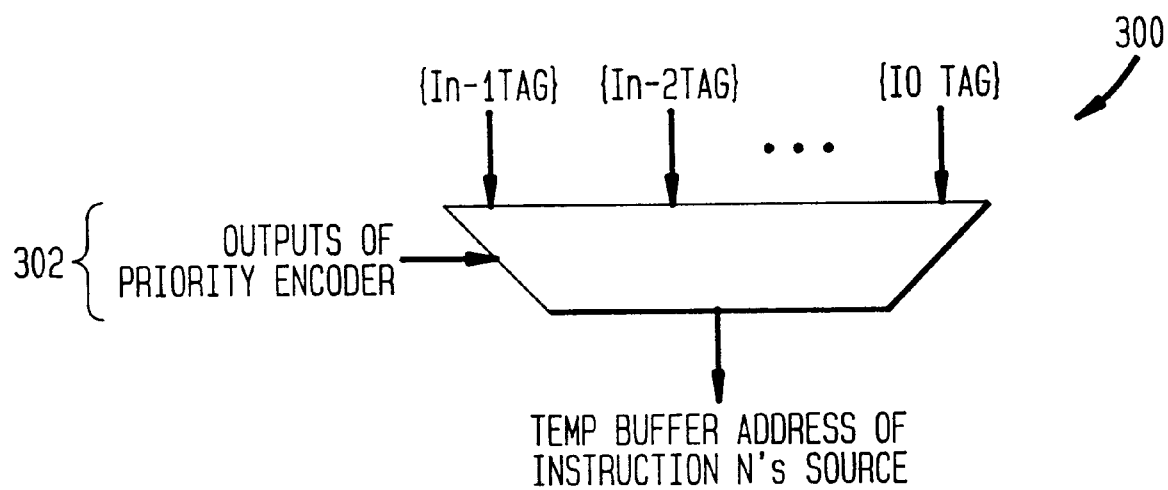
FIG. 3 shows a representative block diagram of the tag assignment logic (TAL) of the present invention.

A representative block diagram of a TAL 300 used to determine the location of instruction n's source (RS) is shown in FIG. 3. The outputs of the priority encoder are connected as select lines (as shown generally at 302) to select the $I_{n-1}$ through $I_0$ TAGs, which are input at the top of TAL 300. TAL 300 thus outputs the temp buffer address of instruction n's source.

Figure 4:
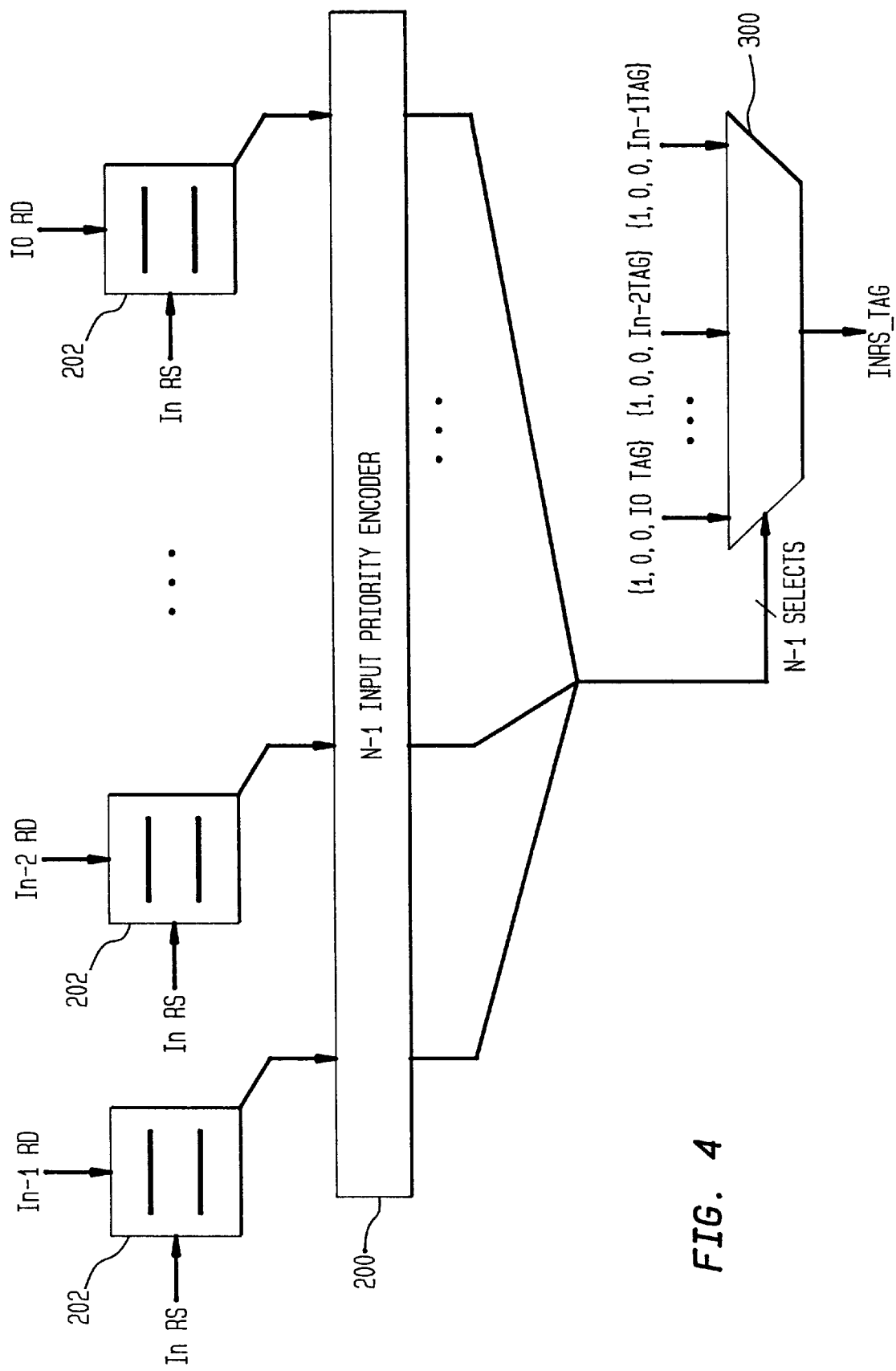
FIG. 4 shows a representative block diagram of the TAL and priority encoder circuit of the present invention.

A complete rename circuit for instruction n's source register is shown in FIG. 4. The term for the renamed register file address of instruction n's source is INRS_TAG.

A representative block diagram of a rename circuit 500 of the present embodiment is shown in FIG. 5A. The address of a new instruction's source register ($I_n$RS) is shown input at the top of the rename circuit 500. The destination register addresses of all preceding instructions in the window are input to rename circuit 500, as shown generally at 502. In addition, all the tags of all preceding instructions in the window are input to rename circuit 500, as shown generally at 504. Rename circuit 500 outputs a tag for the new instruction's source register ($I_n$RS), as shown at 506. The new $I_n$RS tag is assigned by rename circuit 500 according to any dependencies, as discussed above in connection with the other embodiment(s). If the instruction has no dependencies the address input at the top input is simply passed to the output. Given a VAIW of 8 instructions and assuming that the temp buffers 116 have the 8 highest addresses of the 40 total registers, the most significant bit of the rename circuit 500 output indicates whether the result is in the main register file or the temp buffer.

Renaming circuits 508 for renaming the source registers of a plurality of instructions are shown in FIG. 5B. The number "i" in FIG. 5B corresponds to the maximum number of instructions in the window that can be new. In a preferred embodiment "i" is equal to 3; thus requiring 4 rename circuits.

Because renaming only happens when a new instruction enters the window, some technique is needed to store the outputs of the RRC. One technique would be to store the RRC results in a FIFO whenever the instruction window advances. The present embodiment, however, stores the renamed registers in a separate register file (discussed below). Since each instruction's tag stays constant, the renamed source register results from the rename circuits can be stored by tag number. The register file for storing the rename results therefore has one write port for each new instruction in the window and one read port for each instruction in the window.

Figure 6:
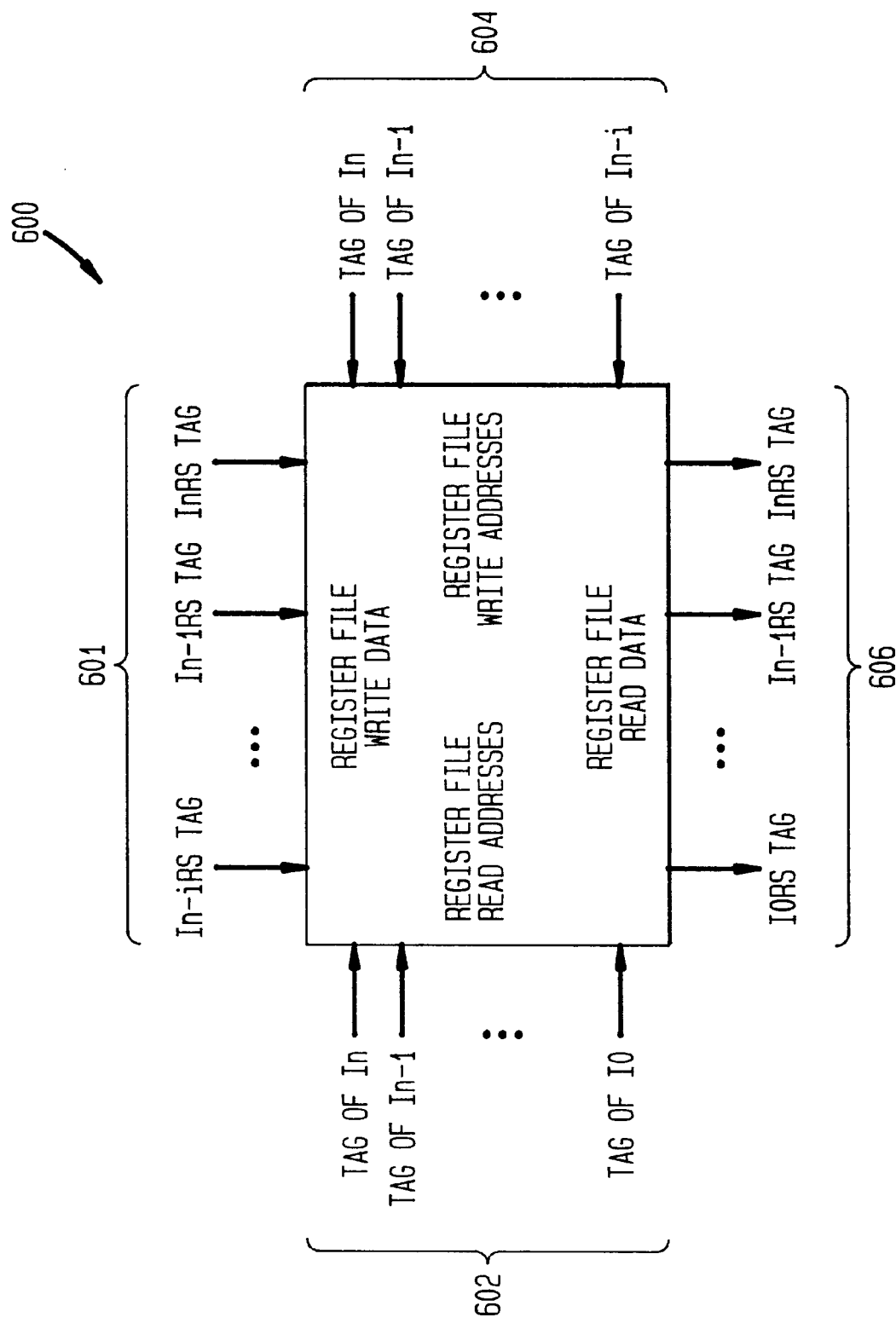
FIG. 6 shows a representative block diagram of the register rename register file of the present invention.
Figure 7:
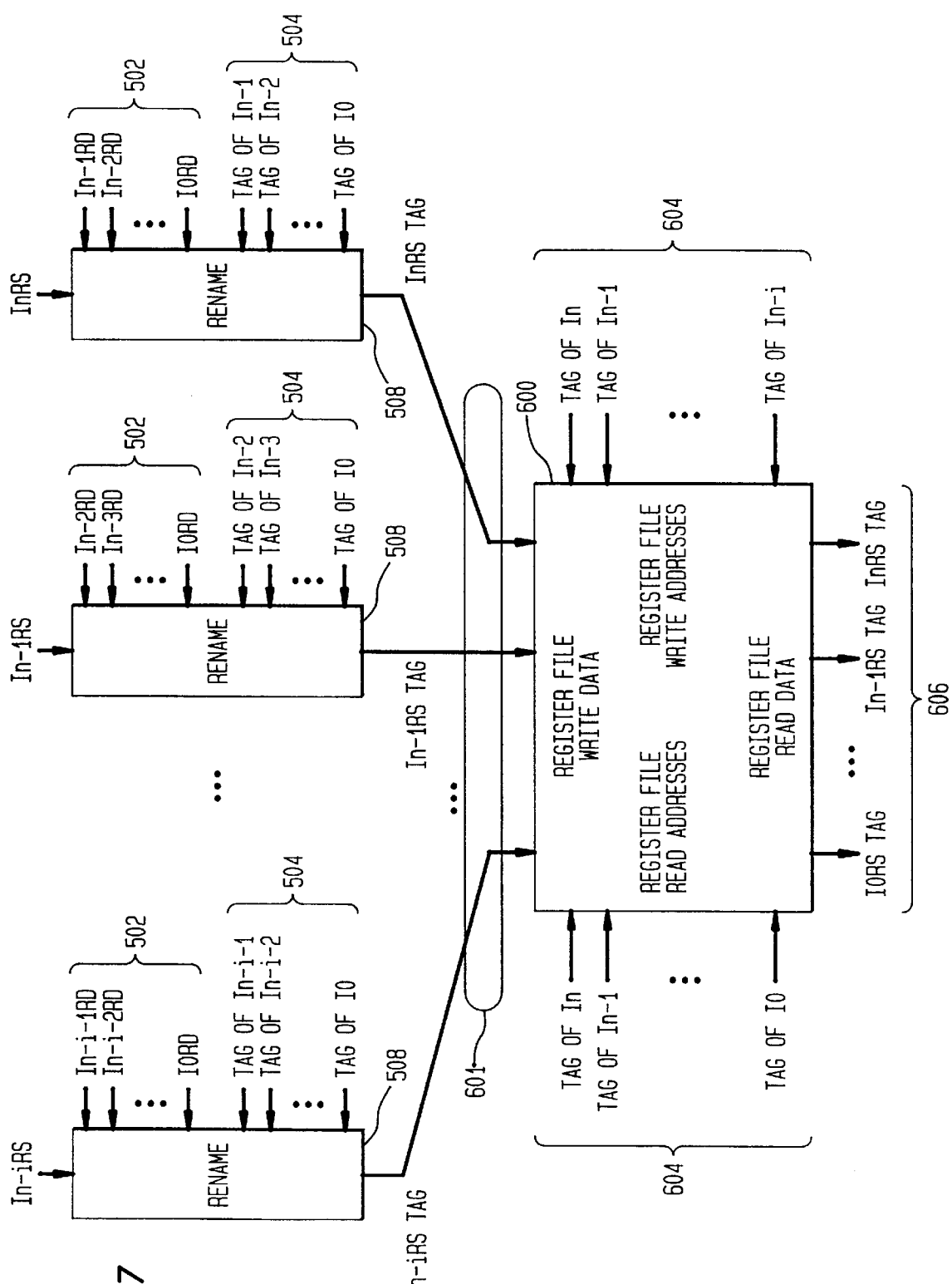
FIG. 7 shows a representative block diagram of the interconnection of the blocks of FIGS. 5B and 6.

A representative block diagram of a rename result register file (RRRF) 600 is shown in FIG. 6. The renamed results are input as "WRITE DATA", as shown generally at 601. "READ ADDRESS" and "WRITE ADDRESS" tags are input to register file 600, as shown generally at 602 and 604, respectively. Renamed results for all the sources of all instructions in the window are available as "READ DATA", as shown generally at 606. FIG. 7 shows rename circuits 508 connected to rename result register file 600.

When an instruction retires its result is moved into the main register file. If any instructions were dependent on that instruction, their renamed sources are not needed anymore.

The area to which new instructions can enter the instruction window (in this embodiment the area is the top four locations), are those locations which are register renamed. Once an instruction leases that area of the window it is no longer renamed. The RRC of the present invention renames an instruction's source register when it enters the window, so there needs to be a mechanism to detect which instructions' sources have been moved to the register file and to replace the renamed source register address with the original source register address. The first part of that mechanism is called MONDEP (as in "monitor dependencies") and the second part is called RFMXING. In addition, a source register ready generator (RDY_GEN) is used to determine when each instruction's sources are available.

Figure 8:
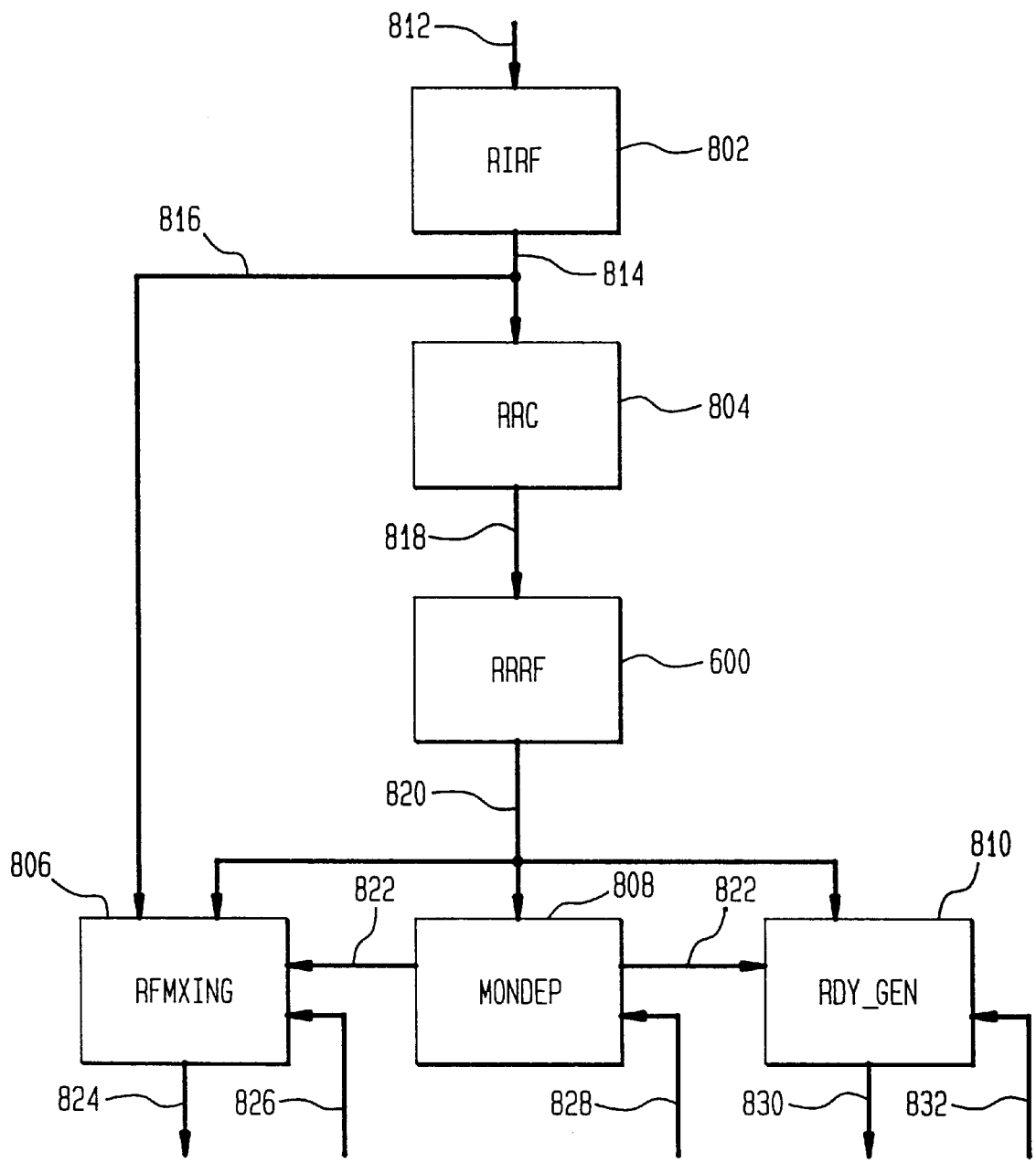
FIG. 8 shows a representative high level block diagram including the RRC of the present invention.

A representative high level block diagram of the RIRF, RRC, RRRF, MONDEP, RDY_GEN and RFMXING (labeled as 802, 804, 600, 806, 808 and 810, respectively) is shown in FIG. 8. Each block 802, 804, 600, 806, 808 and 810 receives the tags of all instructions in the instruction window from the tag FIFO (not shown). Implementation of the tag FIFO will become obvious to one skilled in the art.

Source and destination register addresses of new instructions from the IFU (not shown) are sent to RIRF 802 via a bus 812, and are accessed by RRC 804 via a bus 814. The source registers of all instructions are passed to RFMXING 806 via a bus 816. Renamed source registers of all instructions are stored in RRRF 600 via a bus 818. The stored renamed source registers of all instructions are passed to RFMXING 806, MONDEP 808 and RDY_GEN 810 via a bus 820.

MONDEP 808 determines which dependencies have disappeared by comparing the tags of retiring or recently-retired instructions with the lower three bits of the renamed sources of each instruction. Information regarding retired instructons is sent to MONDEP 808 via a bus 828 from a retirement unit (not shown; the details of a retirement unit that can be used to generate these signals is disclosed in co-pending, commonly owned patent application Ser. No. 07/877,451, filed May 15, 1992 now abandoned). If there is a match, then MONDEP 808 knows that the dependency has been removed and the outputs of MONDEP 808 outputs which instructions' inputs have been moved from the temp buffer to the register file. These outputs signals are sent to RFMXING 806 and RDY_GEN 810 via buses 822.

In a preferred embodiment of the present invention, the instruction window holds eight instructions. Each cycle, at most three of those instructions can be retired. In the cycle after an instruction is retired, its tag is moved to the top of the FIFO. Therefore, to check what dependencies have been removed, MONDEP 808 compares each of the renamed sources of each instruction with the tags of the top three instructions in the FIFO. In a further embodiment MONDEP 808 can compare each renamed source with the tags of the instructions at the bottom of the FIFO that are about to be retired.

MONDEP 808 outputs a bit for each source of each instruction and the bits are sent to RFMXING and RDY_GEN blocks in the RRC. These bits are asserted when an instruction's dependency goes away and remain asserted until the instruction is retired.

RDY_GEN 810 determines when each instruction's sources are available and outputs this information via a bus 830. The difference between MONDEP 808 and RDY_GEN 810 is MONDEP 808 only monitors when instructions retire. An instruction does not have to wait until another instruction retires to use its result; it only needs to wait until it is done (an instruction is done when its result is entered into the temp buffer). Also, if an instruction has no dependencies, then it can be executed immediately. Information concerning whether an instruction is "done" is input to RDY_GEN 810 via a bus 832. "Done" signals come from done control logic (not shown). In connection with the present invention, the term "done" means the result of the instruction is in a temporary buffer or otherwise available at the output of a functional unit. (An example of done control logic may be found the '719 application.)

RDY_GEN 810 has one output for each source of all instructions in the window. The output for a particular instruction's source is assured if one of three conditions is true:

1. The source was never dependent on any other instruction.
2. The instruction that the source was dependent on is done and its result is in the temp buffer.
3. The instruction that the source was dependent on is retired and its result has been moved from the temp buffer to the register file.

These outputs 830 of RDY_GEN 810 go to the ISSUER which determines which instruction(s) is to issued based on functional unit availability and lack of dependencies.

RFMXING 806 is used to generate the read addresses of the register files. It contains a collection of muxes for each read port of each register file. These muxes are selected by the outputs of the ISSUER and MONDEP 808. Read addresses for each port of each register file are output by RFMXING 806, via a bus 824. (A processor may have a separate register file for a floating point subprocessor and an integer subprocessor, for example.)

Figure 9:
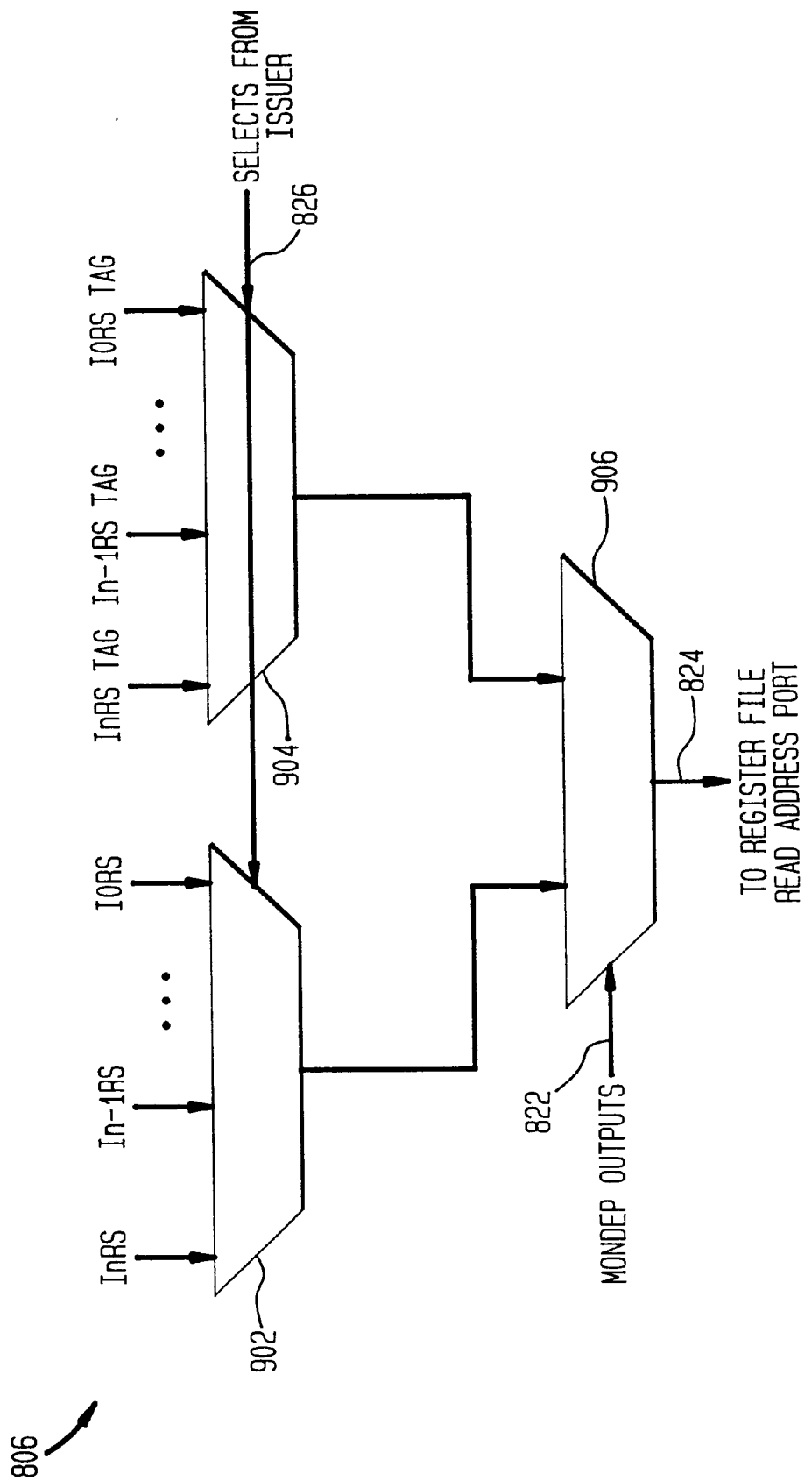
FIG. 9 shows a representative block diagram of a circuit to generate the address for one register file port.

The circuit to generate the address for one register file port is shown in FIG. 9. The ISSUER decides which instructions to execute and which register file ports to use for each instruction by sending select signals via a bus 826 to RFMXING 806. MONDEP 808 decides which instructions sources have been moved from the register file and which are still inside the temp buffer via bus 822. For example, if one assumes that the ISSUER decides to execute instruction $I_n$ and $I_n$ is dependent on $I_{n-1}$; then the ISSUER will select (via select signals 826) two top multiplexers (mux) 902 and 904 and choose $I_n RS$ ($I_n$'s original source register address) and $I_n RS\_TAG$. If it has, MONDEP 808 will select, using a third mux 906, the output of mux 902 on the left and send $I_n RS$ to the register file. If not, it will choose the output of mux 904 on the right and send the $I_n RS\_TAG$ to the register file.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents. All cited patent documents and publications in the above description are incorporated herein by reference.

What is claimed is:

1. A method for avoiding dependencies when concurrently executing instructions, comprising the steps of:
   (1) storing a plurality of instructions in an instruction window;
   (2) assigning a tag to each instruction stored in said instruction window, wherein each tag points to a unique location in a temporary buffer;
   (3) concurrently executing one or more of said plurality of instructions, thereby producing one or more results, wherein each result corresponds to a unique one of said one or more instructions;
   (4) for an instruction executed in step (3), storing said instruction's corresponding result in said location in said temporary buffer pointed to by said tag assigned to said instruction;
   (5) retiring said instruction by transferring said instruction's corresponding result from said temporary buffer to a register in a main register file;
   (6) after retiring said instruction, storing a new instruction in said instruction window; and
   (7) assigning said tag assigned to said retired instruction to said new instruction, thereby recycling said tag.

2. The method according to claim 1, further comprising the steps of:
   (8) associating said tag assigned to a first instruction in the instruction window with a source of a second instruction in the instruction window if said source is dependent on said first instruction;
   (9) selecting a register in a register file to store said tag associated with said source of said second instruction based on said tag assigned to said second instruction; and
   (10) storing said tag associated with said source of said second instruction in said selected register.

3. The method of claim 2, further comprising the step of outputting at a read data port of said register file said tag associated with said source of said second instruction when said tag assigned to said second instruction is applied to a read address port of said register file.

4. The method of claim 2, further comprising the step of determining whether said source of said second instruction is dependent on a result of said first instruction.

5. The method of claim 2, further comprising the step of, after performing step (5) and prior to performing step (6), removing from said instruction window said instruction retired in step (5).

6. The method of claim 5, further comprising the steps of storing said tags assigned to said instructions in the instruction window in a buffer and advancing said tags in said buffer at the same time and by the same amount said instructions in said instruction window are advanced, wherein said tag assigned to said retiring instruction is returned to a head of said buffer.

7. A system for renaming source registers of instructions in an instruction window, comprising:

first control logic that assigns a tag to each new instruction that enters the instruction window, wherein said tag comprises a unique address in a temporary buffer where instruction execution results are stored;

a recycling queue that stores said tags;

a register renaming circuit that selects a tag assigned to a first instruction as a register address of a source register of a second instruction if said source register of said second instruction is dependent on said first instruction, wherein said selected tag is a renamed register address for said source register of said second instruction; and a register file that stores said selected tag at an address location indicated by a tag assigned to said second instruction.

8. The system of claim 7, further comprising a data dependency checker that determines whether a source register of said second instruction is dependent on an instruction result of said first instruction.

9. The system of claim 8, wherein said data dependency checker comprises a priority encoder that determines a highest priority dependency for said first instruction.

10. The system of claim 7, wherein the instruction window is a variable advance instruction window.

11. The system of claim 7, further comprising a retirement unit that determines whether said first instruction has retired.

12. The system of claim 11, further comprising a circuit that selects one of a renamed register address of said second instruction and a main register file address based on whether said first instruction has retired.

13. The system of claim 7, further comprising a comparator that compares a tag of a retired instruction with renamed source addresses to determine whether a dependency exists.

14. The system of claim 7, wherein said recycling queue comprises a plurality of slots equal in number to a predetermined size of the instruction window, wherein each of said plurality of slots contains one of said tags, and wherein an order defined by a position of said assigned tags in said recycling queue corresponds to an order of instructions in the instruction window.

15. A computer system, comprising:

memory unit for storing program instructions;

a processor; and a bus to transfer said program instructions from said memory unit to said processor, wherein said processor comprises:

an instruction window having registers for storing a plurality of instructions;

control logic that assigns a tag to each new instruction that enters said instruction window, wherein said tag comprises a unique address in a temporary buffer where instruction execution results are stored;

a recycling queue that stores said tags;

a register renaming circuit that selects a tag assigned to a first instruction as a register address of a source register of a second instruction if said source register of said second instruction is dependent on said first instruction, wherein said selected tag is a renamed register address for said source register of said second instruction; and a register file that stores said selected tag at an address location indicated by a tag assigned to said second instruction.

16. The computer system of claim 15, further comprising a data dependency checker that determines whether a source register of said second instruction is dependent on an instruction result of said first instruction.

17. The computer system of claim 16, wherein said data dependency checker comprises a priority encoder that determines a highest priority dependency for said first instruction.

18. The computer system of claim 15, wherein the instruction window is a variable advance instruction window.

19. The system of claim 15, further comprising a retirement unit that determines whether said first instruction has retired.

20. The system of claim 19, further comprising a circuit that selects one of a renamed register address of said second instruction and a main register file address based on whether said first instruction has retired.

21. The computer system of claim 15, further comprising a comparator that compares a tag of a retired instruction with renamed source addresses to determine whether a dependency exists.

22. A system for renaming source registers of instructions in an instruction window, comprising:

first control logic that assigns a tag to each instruction in the instruction window, wherein each assigned tag comprises a unique address in a temporary buffer where instruction execution results are stored;

a rename circuit that selects a tag assigned to a first instruction in the instruction window as a register address of a source register of a second instruction in the instruction window if said source register of said second instruction is dependant on said first instruction, wherein said selected tag is a renamed register address for said source register of said second instruction; and a register file that stores said selected tag at an address location indicated by a tag assigned to said second instruction.

23. The system of claim 22, further comprising a recycling queue comprising a plurality of slots for storing said tags.

24. The system of claim 23, wherein said recycling queue comprises a plurality of slots equal in number to a predetermined size of the instruction window.

25. The system of claim 24, wherein an order defined by a position of said assigned tags in said recycling queue corresponds to an order of instructions in the instruction window.

26. The system of claim 22, further comprising a data dependency checker that determines whether said source register of said second instruction is dependant on said first instruction.

27. The system of claim 26, wherein said data dependency checker comprises a priority encoder that determines a highest priority dependency for said source register of second instruction.

28. The system of claim 22, wherein the instruction window is a variable advance instruction window.

29. The system of claim 22, further comprising a retirement unit that transfers are execution result of said first instruction from said temporary buffer to a main register file.

30. The system of claim 29, further comprising second control logic that detects whether said execution result of said first instruction has been transferred from said temporary buffer to said main register file and, upon an issuer selecting to execute said second instruction retrieves said execution result from said main memory if said result has been transferred otherwise said second control logic retrieves said execution result from said temporary buffer.

31. The system of claim 22, further comprising a comparator that compares a tag of a retired instruction with renamed source addresses to determine whether a dependency exists.

32. The system of claim 22, wherein said register file outputs said selected tag at a read data port of said register file when said tag assigned to said second instruction is applied to a read address port of said register file.

33. A computer system, comprising:
   a memory unit for storing program instructions;
   a processor; and
   a bus to transfer said program instructions from said memory unit to said processor, said processor comprising:
      an instruction window having registers for storing a plurality of instructions;
      first control logic that assigns a tag to each instruction in said instruction window wherein each assigned tag comprises a unique address in a temporary buffer where instruction execution results are stored;
      a rename circuit that selects a tag assigned to a first instruction in said instruction window as a register address of a source register of a second instruction in said instruction window if said source register of said second instruction is dependant on said first instruction, wherein said selected tag is a renamed register address for said source register of said second instruction; and
      a register file that stores said selected tag at an address location indicated by a tag assigned to said second instruction.

34. The system of claim 33, further comprising a recycling queue comprising plurality of slots for storing said tags.

35. The system of claim 34, wherein said recycling queue comprises a plurality of slot equal in number to a predetermined size of the instruction window.

36. The system of claim 35, wherein an order defined by a position of said assigned tags in said recycling queue corresponds to an order of instructions in the instruction window.

37. The system of claim 33, further comprising a data dependency checker that determines whether said source register of said second instruction is dependant on said first instruction.

38. The system of claim 37, wherein said data dependency checker comprises a priority encoder that determines a highest priority dependency for said source register of second instruction.

39. The system of claim 33, wherein said instruction window is a variable advance instruction window.

40. The system of claim 33, further comprising a retirement unit that transfers an execution result of said first instruction from said temporary buffer to a main register file.

41. The system of claim 40, further comprising second control logic that detects whether said execution result of said first instruction has been transferred from said temporary buffer to said main register file and, upon an issuer selecting to execute said second instruction, retrieves said execution result from said main memory if said result has been transferred, otherwise said second control logic retrieves said execution result from said temporary buffer.

42. The system of claim 33, further comprising a comparator that compares a tag of a retired instruction with renamed source addresses to determine whether a dependency exists.

43. The system of claim 33, wherein said register file outputs said selected tag at read data port of said register file when said tag assigned to said second instruction is applied to a read address port of said register file.

* * * * *